(12) United States Patent
Iriyama et al.

(10) Patent No.: US 9,503,144 B2
(45) Date of Patent: Nov. 22, 2016

(54) BAND-TYPE WIRELESS COMMUNICATION DEVICE

(71) Applicant: Sharp Kabushiki Kaisha, Osaka-shi, Osaka (JP)

(72) Inventors: Akihiro Iriyama, Osaka (JP); Hiroyuki Takebe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/771,224

(22) PCT Filed: Jul. 15, 2014

(86) PCT No.: PCT/JP2014/068767
§ 371 (c)(1),
(2) Date: Aug. 28, 2015

(87) PCT Pub. No.: WO2015/040940
PCT Pub. Date: Mar. 26, 2015

(65) Prior Publication Data
US 2016/0006472 A1    Jan. 7, 2016

(30) Foreign Application Priority Data
Sep. 18, 2013  (JP) ................................ 2013-193249

(51) Int. Cl.
*H04B 1/38* (2015.01)
*H04B 1/3827* (2015.01)
*H01Q 1/48* (2006.01)
*H01Q 1/27* (2006.01)

(52) U.S. Cl.
CPC .............. *H04B 1/385* (2013.01); *H01Q 1/273* (2013.01); *H01Q 1/48* (2013.01); *H04B 2001/3861* (2013.01)

(58) Field of Classification Search
CPC ................. H04B 2001/3861; H04B 1/385
USPC ............. 455/550.1, 90.3, 569.1, 556.2
See application file for complete search history.

(56) References Cited

U.S. PATENT DOCUMENTS

| 6,278,873 | B1 * | 8/2001 | Itakura | G04G 17/02 455/347 |
| 2010/0134350 | A1 * | 6/2010 | Mohammadian | H01Q 1/243 343/702 |
| 2015/0185707 | A1 * | 7/2015 | Liou | G04R 60/14 368/47 |
| 2015/0294554 | A1 * | 10/2015 | Park | G08B 21/18 340/539.11 |

FOREIGN PATENT DOCUMENTS

| JP | 2001-116858 A | 4/2001 |
| JP | 2003-152582 A | 5/2003 |
| JP | 3560455 B2 | 9/2004 |

(Continued)

OTHER PUBLICATIONS

Official Communication issued in International Patent Application No. PCT/JP2014/068767, mailed on Oct. 7, 2014.

*Primary Examiner* — John J Lee
(74) *Attorney, Agent, or Firm* — Keating & Bennett, LLP

(57) ABSTRACT

A band-type wireless communication device (10A) of an embodiment of the present invention is arranged such that a main body (1) contains an antenna (2) and a ground conductor (3) and that the ground conductor (3) is electrically connected to a metal section (5) on a first belt (4) joined with the main body (1).

5 Claims, 4 Drawing Sheets

(56) References Cited

FOREIGN PATENT DOCUMENTS

| | | |
|---|---|---|
| JP | 2004-312707 A | 11/2004 |
| JP | 2011-502376 A | 1/2011 |
| WO | 2009/048461 A1 | 4/2009 |

\* cited by examiner

BAND-TYPE WIRELESS COMMUNICATION DEVICE

TECHNICAL FIELD

The present invention relates to a band-type wireless communication device wearable on a human arm similarly to a wristwatch.

BACKGROUND ART

A band-type wireless communication device to be worn for use on, for example, an arm includes an antenna device disposed inside the band or built in a housing for compactness or portability of the band-type wireless communication device.

Patent Literature 1 discloses an antenna device for a wristwatch-type wireless communication device which antenna device is arranged to reliably produce high antenna gain and good antenna directivity while the wristwatch-type wireless communication device is worn on an arm. The antenna device of Patent Literature 1 for a wristwatch-type wireless communication device includes a helical antenna built in a main body of the wristwatch. The antenna device includes a means for, in the state where the wristwatch is worn on an arm and placed in front of the human body, (i) positioning the helical antenna away from the human body in the front direction, (ii) orienting the helical antenna so that its axis direction is perpendicular to a main printed circuit board oriented substantially parallel to the arm, and (iii) connecting the helical antenna to the main printed circuit board. The antenna device assumes the arm to serve as an earth conductor for the helical antenna and operates in such a manner that the helical antenna has a main polarization direction perpendicular to the arm. Since the antenna device assumes the arm to serve as an earth conductor for the helical antenna and operates in such a manner that the helical antenna has a main polarization direction perpendicular to the arm, the antenna device prevents the gain from being reduced when the wristwatch is worn on an arm.

CITATION LIST

Patent Literature 1

Japanese Patent Publication No. 3560455 (Registration Date: Jun. 4, 2004)

SUMMARY OF INVENTION

Technical Problem

The antenna device described above of Patent Literature 1, which assumes the arm to serve as an earth conductor for the helical antenna, problematically lacks an earth conductor while the wristwatch is not worn on an arm, with the result of an impaired antenna property.

The present invention has been accomplished in view of the above problem. It is an object of the present invention to provide a band-type wireless communication device having a stable antenna property even while the band-type wireless communication device is not worn on an arm.

Solution to Problem

In order to solve the above problem, a band-type wireless communication device of a mode of the present invention is a band-type wireless communication device fixable to a target with use of at least one band, the band-type wireless communication device including: an antenna; a ground conductor for the antenna; and a metal section provided on the at least one band and electrically connected to the ground conductor.

Advantageous Effects of Invention

A mode of the present invention is arranged such that a ground conductor for an antenna is electrically connected to a metal section on a band. This arrangement allows the metal section to reliably provide a ground conductor area even while the band-type wireless communication device is not worn on an arm. The above arrangement thus allows the band-type wireless communication device to have a stable antenna property.

DESCRIPTION OF EMBODIMENTS

Embodiment 1

The description below deals with an embodiment of a band-type wireless communication device of the present invention with reference to FIGS. 1 and 2.

The band-type wireless communication device of the present invention is a wireless communication device provided with a band for attachment to be wound around an attachment target (that is, an arm or leg). The description below of the present embodiment (Embodiment 1) as an embodiment of the present invention deals with, as an example, a wristwatch-type wireless communication device to be attached to an arm (attachment target).

Figure 1:
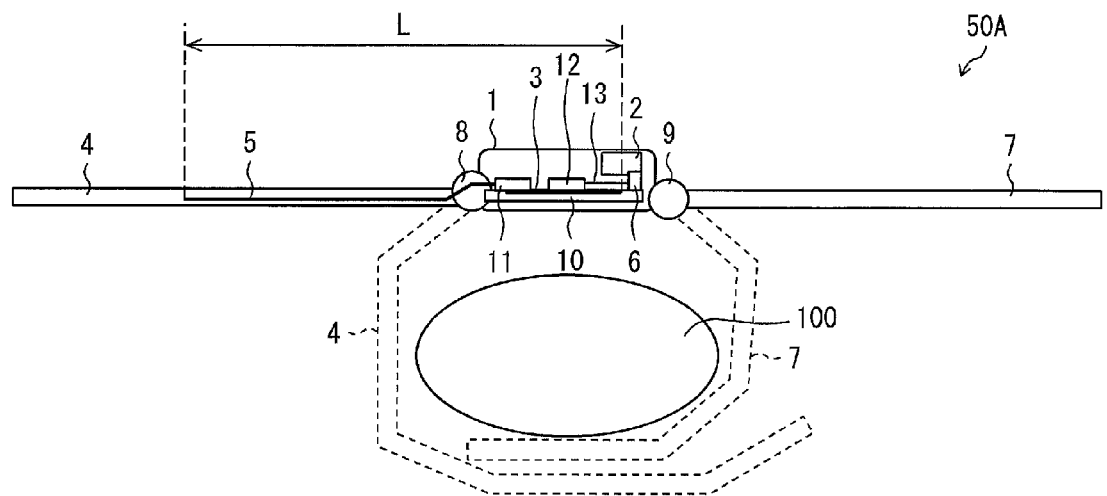
FIG. 1 is a cross-sectional view of an embodiment of a band-type wireless communication device of the present invention.
Figure 2:
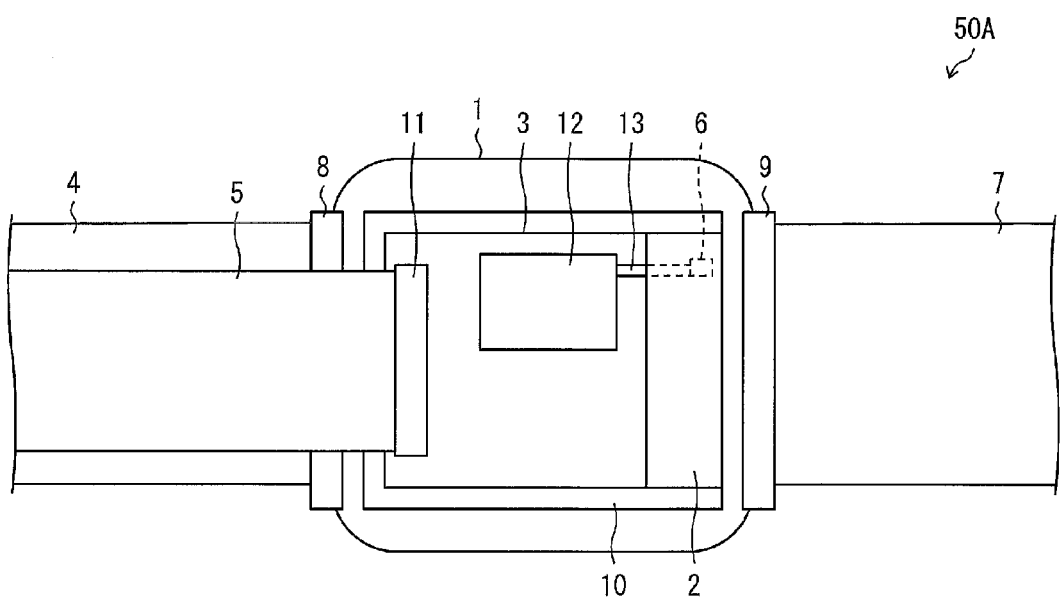
FIG. 2 is a top view of an embodiment of the band-type wireless communication device of the present invention.

FIG. 1 is a cross-sectional view of a band-type wireless communication device of Embodiment 1, the view illustrating a configuration of the band-type wireless communication device. FIG. 2 is a top view of the band-type wireless communication device of Embodiment 1, the view illustrating a configuration of the band-type wireless communication device. FIG. 1 illustrates an arm 100 as an attachment target, and also shows imaginary lines to illustrate how the band-type wireless communication device 50A is wound around the arm 100.

The band-type wireless communication device 50A of Embodiment 1 is an electronic device to be worn for use on, for example, a human arm and capable of receiving information from the outside through a wireless telecommunication. The band-type wireless communication device 50A is, more particularly, a portable electronic device that a person wears on an arm, for example. Examples of the band-type wireless communication device 50A include a wristwatch, a pedometer, a blood pressure manometer, and a heart rate meter.

The band-type wireless communication device 50A of Embodiment 1 includes a main body 1, an antenna 2 built in the main body 1, a ground conductor 3 built in the main body 1 for the antenna 2, a first belt 4 (band) connected to the main body 1, and a metal section 5 provided on the first belt 4. The metal section 5 is electrically connected to the ground conductor 3. The main body 1 further contains a substrate 10, a fastening connector 11, a wireless circuit section 12, and a feed line 13.

The first belt 4 is fixed to the main body 1 via a first belt joining section 8. The main body 1 is provided with a second belt joining section 9 disposed at a position opposite to the first belt joining section 8. The main body 1 is connected to a second belt 7 via the second belt joining section 9.

The first belt joining section 8 and the second belt joining section 9 may each be part of the main body 1 or be an individual member different from the main body 1.

The first belt 4 and the second belt 7 may be positioned around the arm 100 as indicated with the imaginary lines in FIG. 1. This is because (i) the first belt 4 and the second belt 7 are joined rotatably with the main body 1 via the first belt joining section 8 and the second belt joining section 9 respectively and (ii) the first belt 4 and the second belt 7 may each be so deformed as to surround the arm 100. This deformation is not limited to a mode in which the first belt 4 and the second belt 7 are each made of a deformable material such as rubber, and encompasses a mode in which the first belt 4 and the second belt 7 each include a plurality of links as described later, the links being joined with one another with use of pins or the like in such a manner that adjoining links are rotatable with a pin at the center, thereby allowing the first belt 4 and the second belt 7 to each change its shape.

The first belt 4 and the second belt 7 each have a far end opposite to an end joined with the corresponding belt joining section. Those far ends are, in a case where the first belt 4 and the second belt 7 are positioned around the arm 100, fastened to each other via a fastening structure (not shown). The first belt 4 and the second belt 7 are designed to have respective lengths so adjusted as to, when the first belt 4 and the second belt 7 are positioned around the arm 100, allow a portion of an outer surface of the second belt 7 which portion covers (i) the far end of the second belt 7 and (ii) a region near the far end of the second belt 7 to come into contact with a portion of an inner surface (that is, a surface facing the arm) of the first belt 4 which portion covers (i) the far end of the first belt 4 and (ii) a region near the far end of the first belt 4 (see the imaginary lines in FIG. 1). The fastening structure is not limited to any particular structure, and may be a pin buckle structure, a buckle structure, a buckle structure with a fold-over clasp, a buckle structure with a double-folding clasp, or a double-lock buckle structure. A buckle structure with a fold-over clasp allows the buckle to be unfastened on only one side, whereas a buckle structure with a double-folding clasp allows the buckle to be unfastened on both sides. A double-lock buckle structure is a buckle structure with (i) a fold-over clasp and (ii) a hook at the unfastening portion.

The main body 1 contains, on the substrate 10, the antenna 2, the ground conductor 3, an antenna feeding section 6, the fastening connector 11, the wireless circuit section 12, and the feed line 13. The main body 1 may further include a user interface such as a timepiece dial, a display, or an input device.

The ground conductor 3 is a GND pattern on the substrate 10. The ground conductor 3 is contained in the main body 1 and disposed on the side close to the arm 100. The ground conductor 3 is located between the arm 100 and the antenna 2. The ground conductor 3 has a side close to the first belt 4, along which side the fastening connector 11 is provided. The ground conductor 3 underlies the wireless circuit section 12 provided between the fastening connector 11 on the ground conductor 3 and the antenna 2.

The band-type wireless communication device 50A of Embodiment 1 may be a terminal smaller than a mobile telephone or the like. For such a small terminal, however, the ground conductor 3 alone, contained in the main body 1, would not be long enough to generate a mirror image current sufficient for resonance, with the result of insufficient antenna performance. The present embodiment, in view of that, includes a metal section 5 as an extension of the ground conductor 3 to generate a mirror image current sufficient for resonance for reliably sufficient antenna performance. Further, while the band-type wireless communication device 50A is wound around an arm, the ground conductor 3 is coupled to the arm, so that the arm also serves as a virtual ground conductor for reliable antenna performance.

The antenna 2 is connected to the ground conductor 3 (via the antenna feeding section 6) at a position opposite to a side of the ground conductor 3 at which side the metal section 5 is electrically connected to the ground conductor 3. The antenna 2 is connected to the feed line 13 on the substrate 10 via the antenna feeding section 6. The feed line 13 is in turn connected to the wireless circuit section 12. The antenna transmits and receives a signal, which is processed on that path.

The antenna 2 is contained in the main body 1 and disposed on the side far from the arm 100. The antenna 2 may be in the shape of a thin plate, a line, or the like as conventionally publicly known.

The ground conductor 3 is electrically connected to the metal section 5 via the fastening connector 11 near the first belt joining section 8. The metal section 5 extends on and along the first belt 4 across the first belt joining section 8.

The metal section 5 extends from (i) that end of the first belt 4 which is on the side of the first belt joining section 8 to (ii) that end of the first belt 4 which is opposite to the above end. The ground conductor 3 and the metal section 5 combine with each other to have a total length indicated by "L" in FIG. 1. The ground conductor 3 and the metal section 5 are designed to have a length L that is not less than one eighth and not greater than three eighths, preferably one quarter, the wavelength of the resonance frequency of the antenna 2.

Embodiment 1 assumes that the first belt 4 is a rubber band. In such a case, the metal section 5 is made of a metal foil or the like, and is so molded integrally with the rubber band as to lie inside or at the surface of the rubber band. The metal foil is typically a pattern (copper) on a flexible board, but may alternatively be a foil of aluminum, stainless steel, copper, or the like. The metal foil may have a thickness of approximately 40 μm in a case where it is a pattern on a flexible board. The thickness is, however, not limited to such a value.

The metal section 5 on the flexible board is, as described above, connected to the substrate 10 via the fastening connector 11 provided on the substrate 10 for the flexible board. The connection is, however, not limited to such a mode. Alternatively, a flexible board, an aluminum foil, a copper foil, or a stainless steel foil (metal section 5) may be soldered to the ground conductor 3 disposed in the main body 1.

Figure 3:
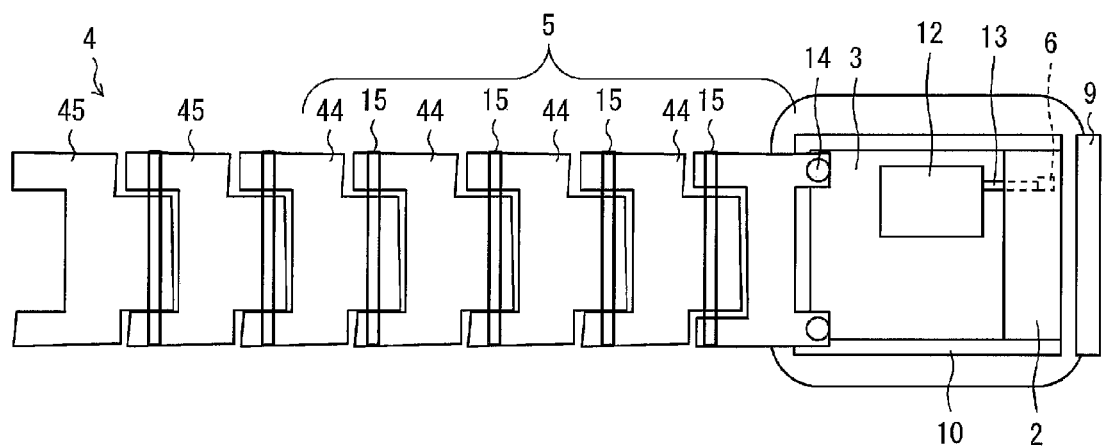
FIG. 3 is a top view of a variation of the embodiment illustrated in FIG. 2.

The first belt 4 may, as described above, include a plurality of links joined with one another with use of pins or the like. With reference to FIG. 3, the description below deals with such a mode, in which the first belt 4 includes a plurality of links joined with one another. FIG. 3 is a top view of a variation of the band-type wireless communication device illustrated in FIG. 2. FIG. 3 illustrates a plurality of links 44 joined with one another with use of pins 15 to form a first belt 4. In this mode, the metal section 5 may include (i) a metal link 44 closest among other links 44 to the main body 1, (ii) some other metal links 44 arranged in a row next to the above closest link 44, and (iii) metal pins 15 joining the metal links 44 with one another to electrically connect those metal links 44 to one another. In this mode, the link 44 closest among other links 44 to the main body 1 is fixed to the ground conductor 3 with screws 14 for electric connection. This mode is arranged such that (i) any link 45 beyond the length L is a nonmetal link or such that (ii) those links 45 are each made of metal, but the pins joining the links 45 with one another are not electrically conductive.

No metal section 5 is provided on the second belt 7.

The first belt 4 is, as described above, provided with a metal section 5 electrically connected to the ground conductor 3. This arrangement allows the metal section 5 to reliably provide a ground conductor area even while the band-type wireless communication device 50A is not worn on an arm. The above arrangement thus allows the band-type wireless communication device 50A to have a stable antenna property even while the band-type wireless communication device 50A is not worn on an arm.

The antenna 2 is fed with electric power from the ground conductor 3 at a position opposite to a side of the ground conductor 3 at which side the metal section 5 is electrically connected to the ground conductor 3. This arrangement reduces electric current that has a phase reverse to the phase of antenna current and that flows through the ground conductor 3 and the metal section 5, and thus further improves the antenna property exhibited while the band-type wireless communication device 50A is not worn.

The metal section 5 and the ground conductor 3 combine with each other to have a total length L that is substantially a quarter the wavelength of the resonance frequency of the antenna 2. This arrangement reduces electric current that has a phase reverse to the phase of antenna current and that flows through the ground conductor 3 and the metal section 5, and thus further improves the antenna property exhibited while the band-type wireless communication device 50A is not worn. Further, the ground conductor 3 and the metal section 5 are designed to have the above length L. This arrangement achieves a good resonance condition for an antenna system including the antenna 2, the ground conductor 3, and the metal section 5, and thus further improves the antenna property exhibited while the band-type wireless communication device 50A is not worn.

Embodiment 1 described herein includes two separate belts so provided respectively on the opposite sides of the main body 1 as to sandwich the main body 1. The present invention is, however, not limited to such an arrangement, and may include a single belt provided in a loop from one end of the main body 1 to the other end thereof to be wound around an arm 100. In a case where the present invention is arranged as such, the present invention may simply include (i) a metal section 5 extending on the belt from one end of the main body 1 over the length L illustrated in FIG. 1 and (ii) a fixing member, for example, capable of detachably fixing an end of the single belt to the other end of the main body 1.

The present embodiment may further include, on the second belt 7, another metal section electrically insulated from the ground conductor.

Embodiment 2

The description below deals with another embodiment of the band-type wireless communication device of the present invention with reference to FIGS. 4 through 6. For convenience of explanation, any member of the present embodiment that is identical in function to a corresponding member described for Embodiment 1 is assigned an identical reference numeral, and is not described here.

Figure 4:
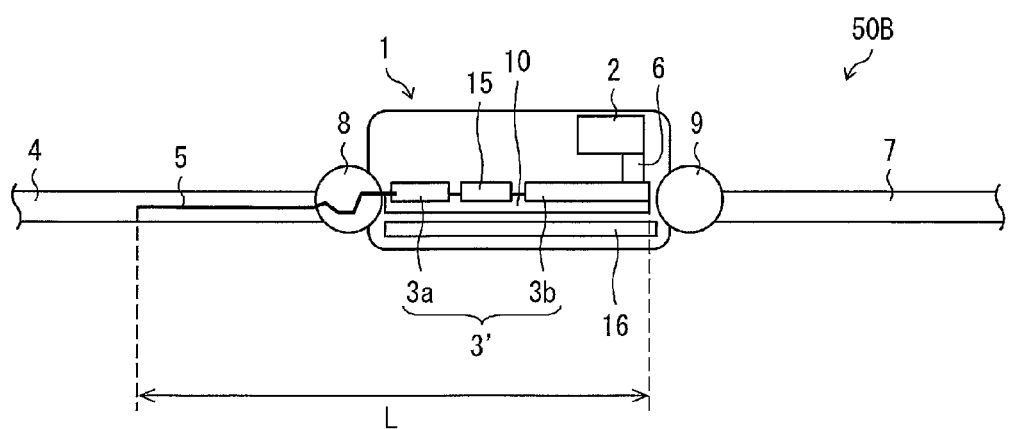
FIG. 4 is a cross-sectional view of a band-type wireless communication device of Embodiment 2 of the present invention.

With reference to FIG. 4, the description below deals with how a band-type wireless communication device of the present embodiment differs from the band-type wireless communication device 50A described above of Embodiment 1. FIG. 4 is a cross-sectional view of a band-type wireless communication device 50B of the present embodiment (Embodiment 2), the view illustrating a configuration of the band-type wireless communication device 50B. FIG. 4 corresponds to FIG. 1 for Embodiment 1.

The band-type wireless communication device 50B of Embodiment 2 includes a ground conductor 3' having (i) a first ground section 3a and (ii) a second ground section 3b connected to the first ground section 3a via a switch 15. The metal section 5 is electrically connected to the first ground section 3a.

The antenna 2 is connected to the second ground section 3b (via the antenna feeding section 6) at a position opposite to a side of the ground conductor 3' at which side the metal section 5 is electrically connected to the ground conductor 3'.

The band-type wireless communication device 50B of Embodiment 2 includes, at a bottom surface of the main body 1, a sensor 16 (detecting section) for detecting an approach of a human body. In a case where the sensor 16 has detected an approach of a human body, the switch 15 is turned off so that the first ground section 3a and the second ground section 3b are not electrically connected to each other. While the sensor 16 does not detect an approach of a human body, the switch 15 remains on so that the first ground section 3a and the second ground section 3b are electrically connected to each other.

Embodiment 2 is designed similarly to Embodiment 1 such that the ground conductor 3' and the metal section 5 combine with each other to have a total length L (that is, the length from (i) that end of the second ground section 3b which is the farthest from the metal section 5 to (ii) that end of the metal section 5 which is the farthest from the ground conductor 3') that is substantially a quarter the wavelength of the resonance frequency of the antenna 2.

Embodiment 2 is advantageous over the band-type wireless communication device 50A of Embodiment 1 in that the antenna property is more stable. This is described below with reference to FIGS. 5 and 6.

Figure 5:
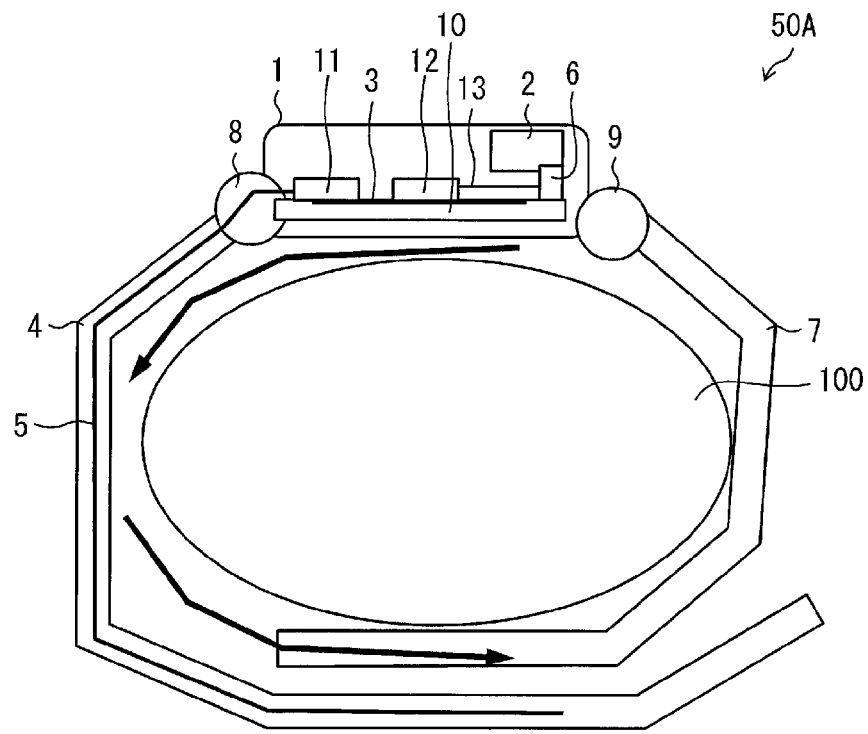
FIG. 5 is a cross-sectional view of a band-type wireless communication device of Embodiment 1 of the present invention, the view illustrating how the band-type wireless communication device is worn around an arm.
Figure 6:
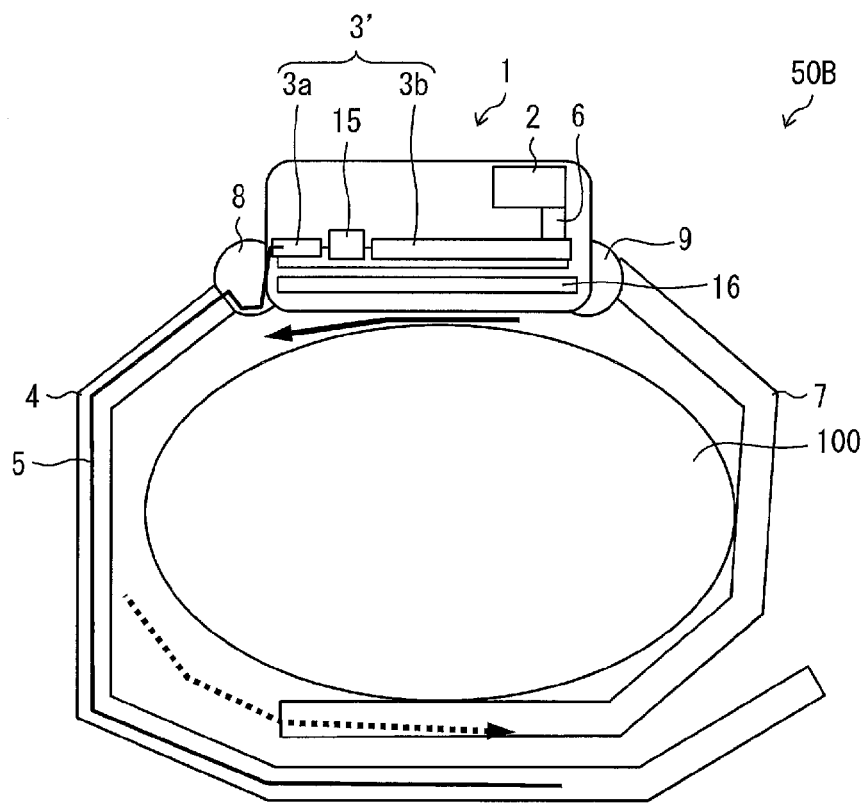
FIG. 6 is a cross-sectional view of a band-type wireless communication device of Embodiment 2 of the present invention, the view illustrating how the band-type wireless communication device is worn around an arm.

FIG. 5 illustrates the band-type wireless communication device 50A of Embodiment 1 wound around an arm 100. FIG. 6 illustrates the band-type wireless communication device 50B of Embodiment 2 wound around an arm 100 similarly to FIG. 5.

The band-type wireless communication device 50A of Embodiment 1 illustrated in FIG. 5 is advantageous as described above in that its antenna property is not easily impaired even while the band-type wireless communication device 50A is not worn on an arm. The antenna property is, however, impaired as follows: When the band-type wireless communication device 50A is worn around an arm 100, the first belt 4 is bent over, which also causes the metal section 5 on the first belt 4 to be bent over. This in turn generates a reverse-phase antenna current through the metal section 5 as indicated by the arrows in FIG. 5. This reverse-phase antenna current interferes with a normal antenna current.

In contrast, the band-type wireless communication device 50B of Embodiment 2, which includes a sensor 16, is arranged such that while the band-type wireless communication device 50B is worn on an arm 100, the switch 15 is off so that the metal section 5 is insulated from the second ground section 3b, with the result of no current through the metal section 5. This arrangement prevents generation of reverse-phase antenna current.

The band-type wireless communication device 50B of Embodiment 2 is further arranged such that while the band-type wireless communication device 50B is worn on an arm 100, the second ground section 3b is coupled to the arm 100 so that the arm 100 serves as a virtual ground conductor. This arrangement provides a reliable antenna property.

As described above, the band-type wireless communication device 50B of Embodiment 2 is advantageously arranged to not only (i) achieve a stable antenna property while the band-type wireless communication device 50B is not worn on an arm, but also (ii) prevent generation of reverse-phase antenna current and reliably achieve a stable antenna property while the band-type wireless communication device 50B is worn on an arm.

Embodiment 3

The description below deals with another embodiment of the band-type wireless communication device of the present invention with reference to FIGS. 7 and 8. For convenience of explanation, any member of the present embodiment that is identical in function to a corresponding member described for Embodiment 1 is assigned an identical reference numeral, and is not described here.

Embodiment 1 described above includes two separate belts (bands) so joined with the main body 1 as to sandwich the main body 1. The present embodiment (Embodiment 3), in contrast, differs from Embodiment 1 in that it includes a single belt that may extend continuously around an arm 100 from an end of the main body 1 to an opposite end thereof.

Figure 7:
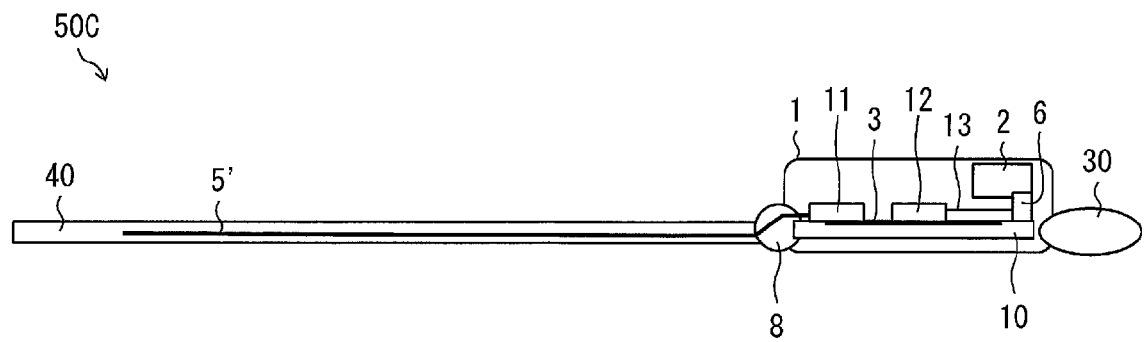
FIG. 7 is a cross-sectional view of a band-type wireless communication device of Embodiment 3 of the present invention.
Figure 8:
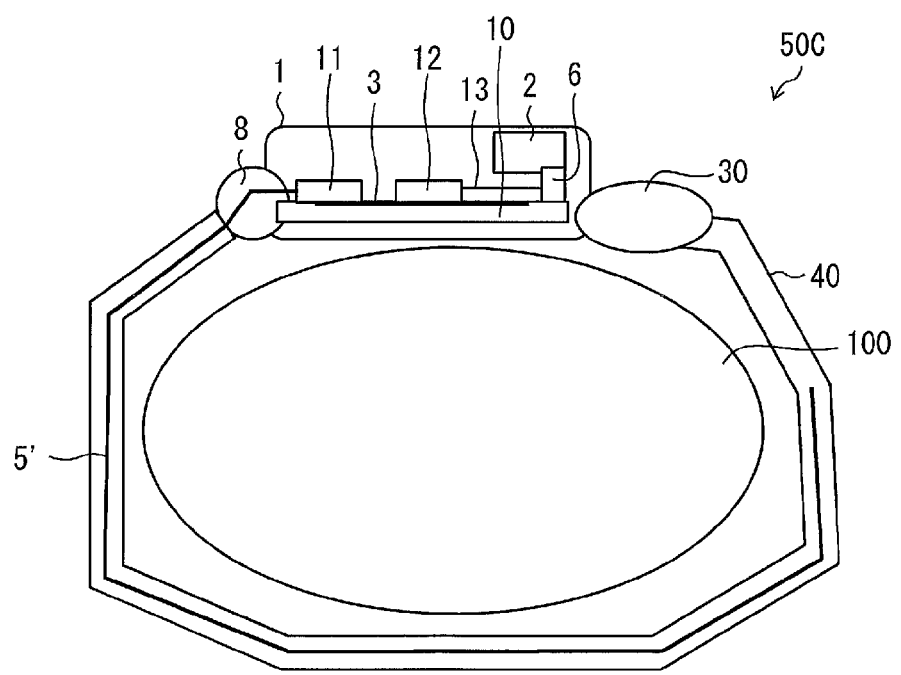
FIG. 8 is a cross-sectional view of a band-type wireless communication device of Embodiment 3 of the present invention, the view illustrating how the band-type wireless communication device is worn around an arm.

FIG. 7 is a cross-sectional view of a band-type wireless communication device 50C of Embodiment 3, the view illustrating a configuration of the band-type wireless communication device 50C not worn on an arm. FIG. 8 illustrates the band-type wireless communication device 50C of Embodiment 3 worn on an arm.

The band-type wireless communication device 50C of Embodiment 3 includes a belt fixing section 30 at a position on the main body 1 which position is opposite to the first belt joining section 8. The band-type wireless communication device 50C further includes a belt 40 (single band) joined with the first belt joining section 8 which belt 40 is detachably fixed to the belt fixing section 30.

The belt 40 is provided with a metal section 5' substantially identical to the metal section 5 described for Embodiment 1. The metal section 5' of Embodiment 3 differs from the metal section 5 of Embodiment 1 in that the metal section 5' extends along the belt 40 over a length larger than the length over which the metal section 5 extends. Embodiment 3, which includes a single continuous belt around an arm 100, allows the metal section 5' to be longer. Embodiment 3 thus allows a long metal section 5' to be provided on a belt as compared to the case of including two belts and providing a single metal section 5 on one of the two belts.

The metal section 5' is similar to the metal section 5 of Embodiment 1 in that it is electrically connected to the ground conductor 3 near the first belt joining section 8. The metal section 5' extends along the belt 40 to have an end near the belt fixing section 30. FIG. 8 illustrates a metal section 5' extending far beyond a position on the arm 100 which position is opposite to the position at which the main body 1 is disposed.

The band-type wireless communication device 50C of Embodiment 3, as described above, includes a long metal section 5'. The band-type wireless communication device 50C thus allows the ground conductor to be sufficiently long for an antenna having a low resonance frequency, as compared to the band-type wireless communication device 50A of Embodiment 1, which includes the metal section 5. The band-type wireless communication device 50C, as a result, advantageously has an improved antenna property exhibited while the band-type wireless communication device 50C is not worn around an arm.

[Recap]

The band-type wireless communication device 50A, 50B, 50C of mode 1 of the present invention is a band-type wireless communication device 50A, 50B, 50C fixable to a target with use of at least one band (first belt 4, belt 40), the band-type wireless communication device 50A, 50B, 50C including an antenna 2, a ground conductor 3, 3' for the antenna 2, and a metal section 5, 5' provided on the at least one band (first belt 4, belt 40) and electrically connected to the ground conductor 3, 3'.

With the above arrangement, a ground conductor for an antenna is electrically connected to a metal section on a band. This arrangement allows the metal section to reliably provide a ground conductor area even while the band-type wireless communication device is not worn on an arm. The above arrangement thus allows the band-type wireless communication device to have a stable antenna property.

While the band-type wireless communication device is worn on an arm, the ground conductor is coupled to the arm so that the arm serves as a virtual ground conductor. This arrangement provides a reliable antenna property.

The band-type wireless communication device 50A, 50B, 50C of mode 2 of the present invention is arranged as in mode 1 above, and may preferably be further arranged such that the antenna 2 is connected to a portion of the ground conductor 3, 3' which portion is opposite to a side of the ground conductor 3, 3' at which side the metal section 5, 5' is electrically connected to the ground conductor 3, 3'.

The above arrangement reduces electric current that has a phase reverse to the phase of antenna current and that flows through the ground conductor and the metal section, and thus further improves the antenna property exhibited while the band-type wireless communication device is not worn on an arm.

The band-type wireless communication device 50B of mode 3 of the present invention is arranged as in mode 1 or 2 above, and may preferably be further arranged such that the ground conductor 3' includes (i) a first ground section 3a and (ii) a second ground section 3b connected to the first ground section 3a via a switch 15; the metal section 5 is electrically connected to the first ground section 3a; and the antenna 2 is connected to a portion of the second ground section 3b which portion is opposite to a side of the ground conductor 3' at which side the metal section 5 is electrically connected to the ground conductor 3', the band-type wireless communication device 50B further including a detecting section (sensor 16) for detecting an approach of a human body, wherein in a case where the detecting section (sensor 16) has detected the approach, the switch 15 is turned off so that the first ground section 3a and the second ground section 3b are not electrically connected to each other; and while the detecting section (sensor 16) does not detect the approach, the switch 15 remains on so that the first ground section 3a and the second ground section 3b are electrically connected to each other.

While the band-type wireless communication device is worn on an arm, that is, while the belt is wound around an arm, the belt is bent over, which generates a reverse-phase antenna current through the metal section on the belt. This may impair the antenna property. Mode 3 above is, in contrast, arranged such that while the band-type wireless communication device is worn on an arm, the metal section is insulated from the second ground section, with the result of no antenna current and no reverse-phase antenna current. While the band-type wireless communication device is worn on an arm, the second ground section is coupled to the arm so that the arm serves as a virtual ground conductor. This arrangement provides a reliable antenna property.

The band-type wireless communication device of mode 4 of the present invention is arranged as in any one of modes 1 to 3 above, and may preferably be further arranged such that the metal section 5, 5' and the ground conductor 3, 3' are connected to each other to have a total length that is not less than one eighth and not greater than three eighths a wavelength of a resonance frequency of the antenna 2.

The above arrangement reduces electric current that has a phase reverse to the phase of antenna current and that flows through the ground conductor and the metal section, and thus further improves the antenna property exhibited while the band-type wireless communication device is not worn on an arm.

The above arrangement achieves a good resonance condition for an antenna system including the antenna, the ground conductor, and the metal section, and thus further improves the antenna property exhibited while the band-type wireless communication device is not worn on an arm.

The band-type wireless communication device of mode 5 of the present invention is arranged as in any one of modes 1 to 4 above, and may preferably be further arranged such that the band-type wireless communication device is fixable to the target with use of a single band (belt 40).

The band length is inevitably larger in a mode in which the band-type wireless communication device is fixed to a target with use of a single band (belt 40) than in a mode in which the band-type wireless communication device includes two bands (that is, the first belt 4 and the second belt 7). The above arrangement allows a longer metal section to be provided on the band, and thus allows the ground conductor to be sufficiently long for an antenna having a low resonance frequency. The above arrangement, as a result, allows the band-type wireless communication device to exhibit a good antenna property while the band-type wireless communication device is not worn on an arm.

The term "single band" as used herein refers to any single continuous band provided between, in the case of Embodiment 3, the first belt joining section 8 of the main body 1 and the belt fixing section 30 thereof. The "single band" may also refer to, for example, (i) a band including a plurality of links arranged continuously between the first belt joining section 8 and the belt fixing section 30 or (ii) a belt 40 as of Embodiment 3 which belt 40 includes a plurality of layers stacked on top of one another.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining technical means disclosed in different embodiments can provide a new technical feature.

INDUSTRIAL APPLICABILITY

The present invention is suitably applicable as a wristwatch-type antenna device.

REFERENCE SIGNS LIST 1 main body
2 antenna
3, 3' ground conductor
3a first ground section
3b second ground section
4 first belt (band)
5, 5' metal section
6 antenna feeding section
7 second belt
8 first belt joining section
9 second belt joining section
10 substrate
11 fastening connector
12 wireless circuit section
13 feed line
14 screw
15 switch
16 sensor (detecting section)
30 belt fixing section
40 belt (band, single band)
44, 45 link
50A, 50B, 50C band-type wireless communication device
100 arm

The invention claimed is:
1. A band-type wireless communication device, comprising:
a main body;
an antenna built in the main body; and
a ground conductor of the antenna which ground conductor is built in the main body, wherein
the band-type wireless communication device is fixable to a target with use of at least one band connected to the main body,
the band-type wireless communication device further includes:

a metal section provided on only one of the at least one band and electrically connected to the ground conductor, the antenna is connected is connected to a portion of the ground conductor adjacent a first end of the ground conductor opposite to a second end of the ground conductor which the metal section is electrically connected to; and the metal section is outside the main body and inside or on a surface of the only one of the at least one band.

2. The band-type wireless communication device according to claim 1, wherein the ground conductor includes (i) a first ground section and (ii) a second ground section connected to the first ground section via a switch.

3. The band-type wireless communication device according to claim 1, wherein the band-type wireless communication device is fixable to the target with use of a single band.

4. A band-type wireless communication device, comprising:

an antenna; and a ground conductor for the antenna, the band-type wireless communication device being fixable to a target with use of at least one band, the band-type wireless communication device further comprising a metal section provided on the at least one band and electrically connected to the ground conductor, the ground conductor including (i) a first ground section and (ii) a second ground section connected to the first ground section via a switch, the metal section being electrically connected to the first ground section, the antenna being connected to a portion of the second ground section which portion is opposite to a side of the ground conductor at which side the metal section is electrically connected to the ground conductor, the band-type wireless communication device further comprising a detecting section for detecting an approach of a human body, in a case where the detecting section has detected the approach, the switch being turned off so that the first ground section and the second ground section are not electrically connected to each other, while the detecting section does not detect the approach, the switch remaining on so that the first ground section and the second ground section are electrically connected to each other.

5. A band-type wireless communication device, comprising:

an antenna; and a ground conductor for the antenna, the band-type wireless communication device being fixable to a target with use of at least one band, the band-type wireless communication device further comprising a metal section provided on the at least one band and electrically connected to the ground conductor, the metal section and the ground conductor being connected to each other to have a total length that is not less than one eighth and not greater than three eighths a wavelength of a resonance frequency of the antenna.

* * * * *